(12) United States Patent
Ledbetter et al.

(10) Patent No.: US 8,161,631 B1
(45) Date of Patent: Apr. 24, 2012

(54) MOTOR CONTROLLED BUCKET REPLACEMENT TOOL

(76) Inventors: Finley Lee Ledbetter, Argyle, TX (US);
Ashley Sue Ledbetter, Argyle, TX (US)

( * ) Notice: Subject to any disclaimer, the term of this patent is extended or adjusted under 35 U.S.C. 154(b) by 398 days.

(21) Appl. No.: 12/563,038

(22) Filed: Sep. 18, 2009

(51) Int. Cl.
*H02B 3/00* (2006.01)

(52) U.S. Cl. ....... 29/762; 29/756; 200/50.21; 200/50.24

(58) Field of Classification Search ............ 29/756, 29/762; 200/50.21, 50.24
See application file for complete search history.

(56) References Cited

U.S. PATENT DOCUMENTS

| | | | |
|---|---|---|---|
| 4,713,501 A * | 12/1987 | Herrmann | 200/50.22 |
| 4,937,403 A * | 6/1990 | Minoura et al. | 200/50.21 |
| 5,453,587 A * | 9/1995 | Hurley et al. | 200/50.24 |
| 5,477,017 A | 12/1995 | Swindler et al. | |
| 6,777,627 B1 | 8/2004 | Stevenson | |
| 6,897,388 B2 | 5/2005 | Greer | |
| 6,951,990 B1 | 10/2005 | Miller | |
| 7,019,230 B1 | 3/2006 | Vaill et al. | |
| 2010/0024191 A1* | 2/2010 | Ledbetter | 29/428 |

* cited by examiner

*Primary Examiner* — Livius R Cazan (74) *Attorney, Agent, or Firm* — Buskop Law Group, PC; Wendy Buskop (57) ABSTRACT

A motor control bucket replacement tool, such as for circuit breakers, that is portable, and rugged for providing electrically operated controlled insertion and removal of electrical equipment by an operator from a remote location using an easily detachable magnetic coupling device for engagement with the electrical equipment and using a linear actuator.

18 Claims, 8 Drawing Sheets

MOTOR CONTROLLED BUCKET REPLACEMENT TOOL

FIELD

The present embodiments generally relate to remotely controlled equipment that removes and installs withdrawable motor control center components.

BACKGROUND

A need exists for a rollable, repositionable tool that prevents harm to humans in a facility which has electrical equipment that needs replacing and is susceptible to arcing during testing, maintenance or switching out of equipment on a piece by piece basis.

A need exists for a tool that can be remotely operated by a human and used for performing maintenance or switching out of equipment such as in a circuit breaker room on a piece by piece basis without shutting down power to the entire facility. A need not to shut down a hospital is particularly important for hospitals, but also has an impact on other facilities, such as hotels which have 24 hour, 7 day a week occupation by at least one resident.

It is common for a large facility, such as a hospital or a hotel, to have to shut down all power in the facility for 1 and ½ hours to replace circuit breakers and do other manual electrical maintenance in a switching room. Typically, a hotel has to shut off power, typically between 3:00 am and 4:30 am at least once a year to replace used or worn equipment. A hotel often has pilots staying with them, and these customers, who typically need to be up at 4:00 am, will not stay at the hotel that night, causing a loss of revenue. In a time of recession, loss of customers is to be avoided, and a need has existed for a device to replace this equipment without shutting down the facility.

More importantly, hospitals that need to perform the same shut down and prevent arcing in their switch rooms, do not desire a total shut down even for 1 hour. A hospital prefers to stay "on line," that is, fully powered, otherwise it needs to provide back up power to its emergency room, life support facilities, and intensive care units, where patients are on breathing machines. The time of shut down, scheduling, and costs involved are large, and if something goes wrong it can mean loss of a patient's life.

If no shut down is performed, and the equipment is worked on by hand, the switching room can generate "arcs" of electricity that can cause first and second degree burns to an operator manually swapping out or otherwise working on the equipment.

A need has existed for a tool that can be operated remotely by a human that is low cost and prevents the shut down of a facility to swap out circuit breakers or similar "electric arc" producing equipment.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present system in detail, it is to be understood that the system is not limited to the particular embodiments and can be practiced or carried out in various ways.

The present embodiments relate to a remotely operated tool termed herein "a bucket extractor" for removing equipment in a facility, such as removing circuit breakers or other withdrawable electrical apparatus, such as those commonly found in a switch room of a hospital.

The moveably, relocatable tool enables an operator to no longer need to wear the typical inch thick full body arc flash hazard suit when operating the tool.

The tool allows an owner to more easily maintain equipment in an electric room, clean it up and lube it up, without needing to shut down the entire facility during such maintenance because there is a remote-control for operating the tool.

The invention can be operated by a user without detailed training. An unskilled worker can use this tool in less than 1 hour from seeing the tool for the first time.

The tool enables a wide variety of plant personnel, trained and untrained, to perform the maintenance function safely.

The embodiments can prevent explosions and arcing fires of electricity from reaching a person, as the operator, because the operator can be in a different room while the tool is operating.

This tool is easy to move, enabling men and women, strong or frail, to move, install, and remotely operate the device.

The equipment prevents an arc explosion from harming people during live switching, live switch testing, or live maintenance of electric equipment. This device allows one circuit breaker to be shut down and replaced while an entire bus of circuit breakers remains live and operational.

This tool can roll up and down stairs easily for use in many places in a facility.

The tool is extraordinarily effective in saving time and money during maintenance, as no power shut down is needed.

The tool saves humans from harm, by enabling operation of the device from a safe distance away from the circuit breakers or similar electrical equipment devices.

The invention includes in an embodiment a first riser and a second riser extending from a base support. The base support provides a first load-supporting wheel and a second load-supporting wheel.

The tool can use at least one floor lock to prevent movement of the base support.

A high-lift support rail is fixed to a first and second high-lift rail bracket connected between the first and second risers.

A first high-lift support rail bracket and a second high-lift support rail bracket are connected between the first and second risers for supporting the high-lift support rail.

A first high-lift moveable slide is connected to the first high-lift support rail and a second high-lift moveable slide is connected to the first high-lift support rail.

A moveable high-lift rail is connected to the first and second high-lift moveable slides. A first moveable slide engages the moveable high-lift rail and a second moveable slide is connected to the moveable high-lift rail.

A moveable mounting brace with at least one moveable magnetic pad is installed on the bucket extractor tool for engaging a metal surface proximate to electrical equipment of interest. The moveable mounting brace is telescopically connected to the second moveable slide.

A linear actuator with a detachable push-pull unit engages electrical equipment of interest for removing or inserting a portion of the electrical equipment while adjacent electrical equipment is operating with a voltage. The linear actuator is connected to the first moveable slide.

A remote-switch operator connected to the linear actuator remotely controls and powers the linear actuator.

The tool is made up of a first riser and a second riser extending from a base support.

The first and second risers can be rounded tubulars connected to the base support in a "U" shape.

The base support can be made from plate steel that is reinforced. The base support engages a first load-supporting wheel and a second load-supporting wheel. The load-supporting wheels can be rubberized, electric isolating wheels on rigid wheel centers.

To the base support, can be attached at least one floor lock to prevent movement of the base support. The floor lock can be foot operated pedal designs which provide a suction type connection to concrete or smooth floor, or can be another type of foot lock that locks the load-supporting wheels and prevents them from turning, enabling the device to be stable.

A high-lift support rail is fixed to and connected between the first and second risers. The high-lift support rail can be made of aluminum. The high-lift support rail, in an embodiment, is centered between the first and second riser using a first horizontal brace at about a 90 degree angle to the high-lift support rail that engages the first and second riser on each end. The horizontal brace for the high-lift support rail can be mounted over the braces used between the first and second risers to provide a sturdy frame to the tool.

The moveable high-lift rail is connected in parallel to the high-lift support rail in a sliding engagement that can be raised or lowered and fixed into place, and then moved again. The moveably high-lift rail can create a telescoping effect adjacent the high-lift support rail.

The moveable mounting brace operates at about a 90 degree angle to the moveable high-lift rail. The brace is secured on one end to the moveable high-lift rail and on the other end has at least one moveable magnetic pad for engaging a metal surface proximate to electrical equipment of interest. The brace can have two moveable magnetic pads that move in and out of a housing, in an embodiment. Other versions of the moveable magnetic pads are also contemplated herein.

Parallel to the moveable mounting brace is the linear actuator with a detachable one push-pull unit for engaging electrical equipment of interest and removing or inserting a portion of the electrical equipment while adjacent electrical equipment is operating with a voltage.

The linear actuator has a motor and can be a variable speed motor adapted to run on about 110 volt current or on about a 12 volt DC current.

A remote operated switch is mounted between the risers and is connected to the linear actuator for remotely controlling and powering the linear actuator while distanced from possible arc flashing during equipment removal, installation or maintenance.

A holding basket can be used between the risers and even extending from the risers opposite the linear actuator for supporting the remote operated switch that powers the linear actuator. The basket can be made of steel, such as ¼ diameter solid tubular steel.

The high-lift support rail can be between about 6 feet to about 12 feet in length. The high-lift rail can have the same length, but twice the width of the high-lift support rail. The high-lift support rail and the high-lift rail can be configured to both be made from a generally hollow, lightweight, strong aluminum alloy.

The high-lift support rail in an embodiment has a first and second high-lift slider slidably connected to the high-lift support rail for moveably and fixedly supporting the high-lift rail. These devices are generally rectangular and act as a stop as well as a support for the sliding high-lift rail.

The high-lift rail in an embodiment has a first channel about 1 inch in depth and a second channel having the same depth parallel to the first channel in the same rail.

A front axle in an embodiment is connected to the base support and a first front wheel is on one end of the axle and a second front wheel is on the other end of the axes. This gives a 4 point support to the risers and linear actuator for good stability with no rocking, no vibration, and a rigid stance for insertion of the electrical equipment or removal of the electrical equipment and dealing with the weight of the electrical equipment by the tool.

It can be noted that in an embodiment the first and second front wheels have a diameter less than about 25 percent the diameter of the load-supporting wheels.

A power supply mount can be positioned and fastened, such as with bolts or similar fasteners, or even welded, between the first and second risers on at least one brace for supporting an AC/DC power supply at least engagaeble with about 110 volts of AC current from a power grid.

An embodiment can contemplates that a quick-disconnect can be used with the linear actuator to quickly install and replace push-pull units having different shapes, different features as needed.

At least two high-lift stops are mounted to the high-lift rail to prevent excessive movement of the high-lift rail in an embodiment.

Figure 1A:
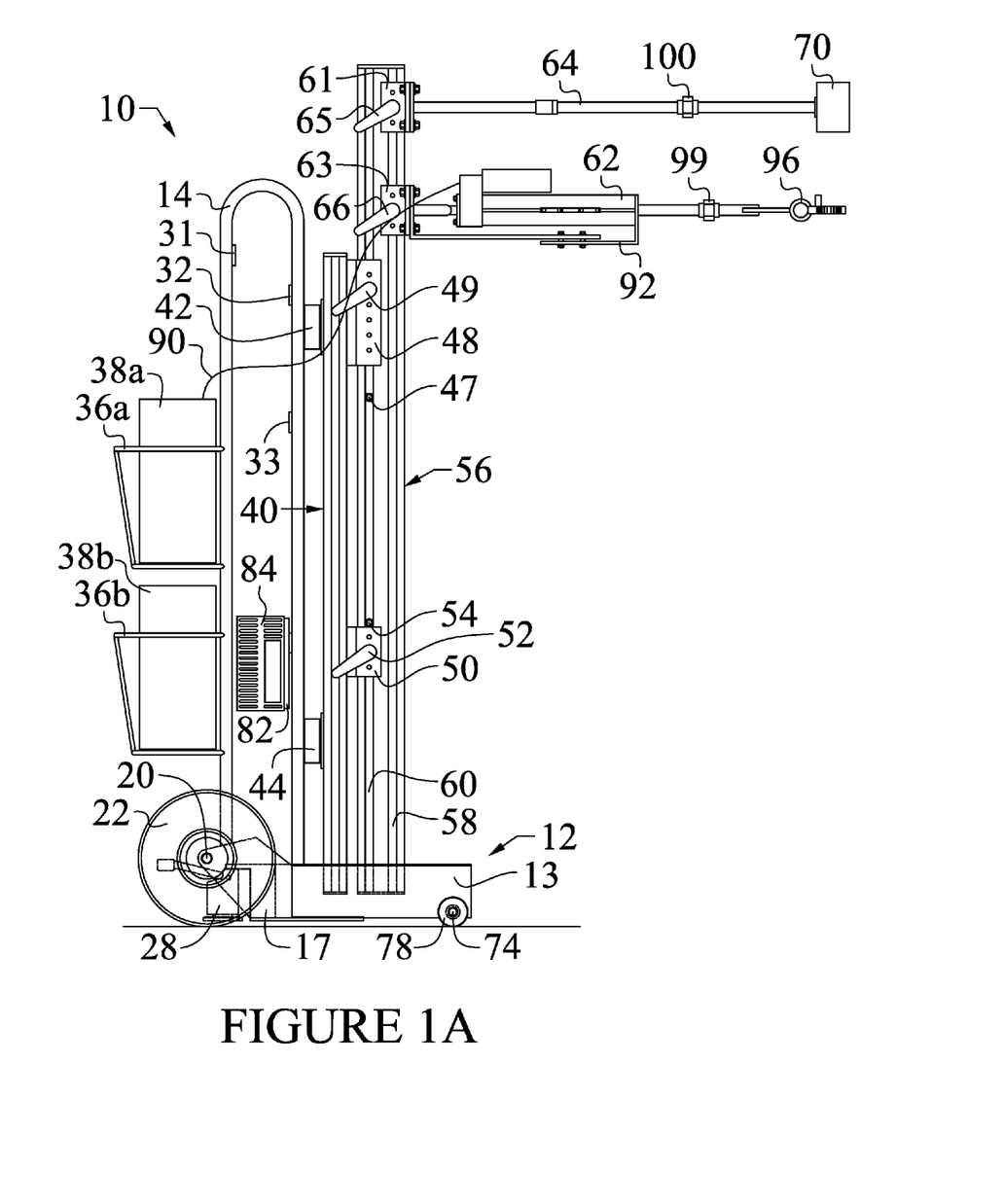
FIG. 1A is a left side view of the remotely operable tool which is also referred to herein as "a bucket extractor."

Turning now to the Figures, FIG. 1A shows a left side view of an embodiment of a bucket extractor 10.

Figure 1B:
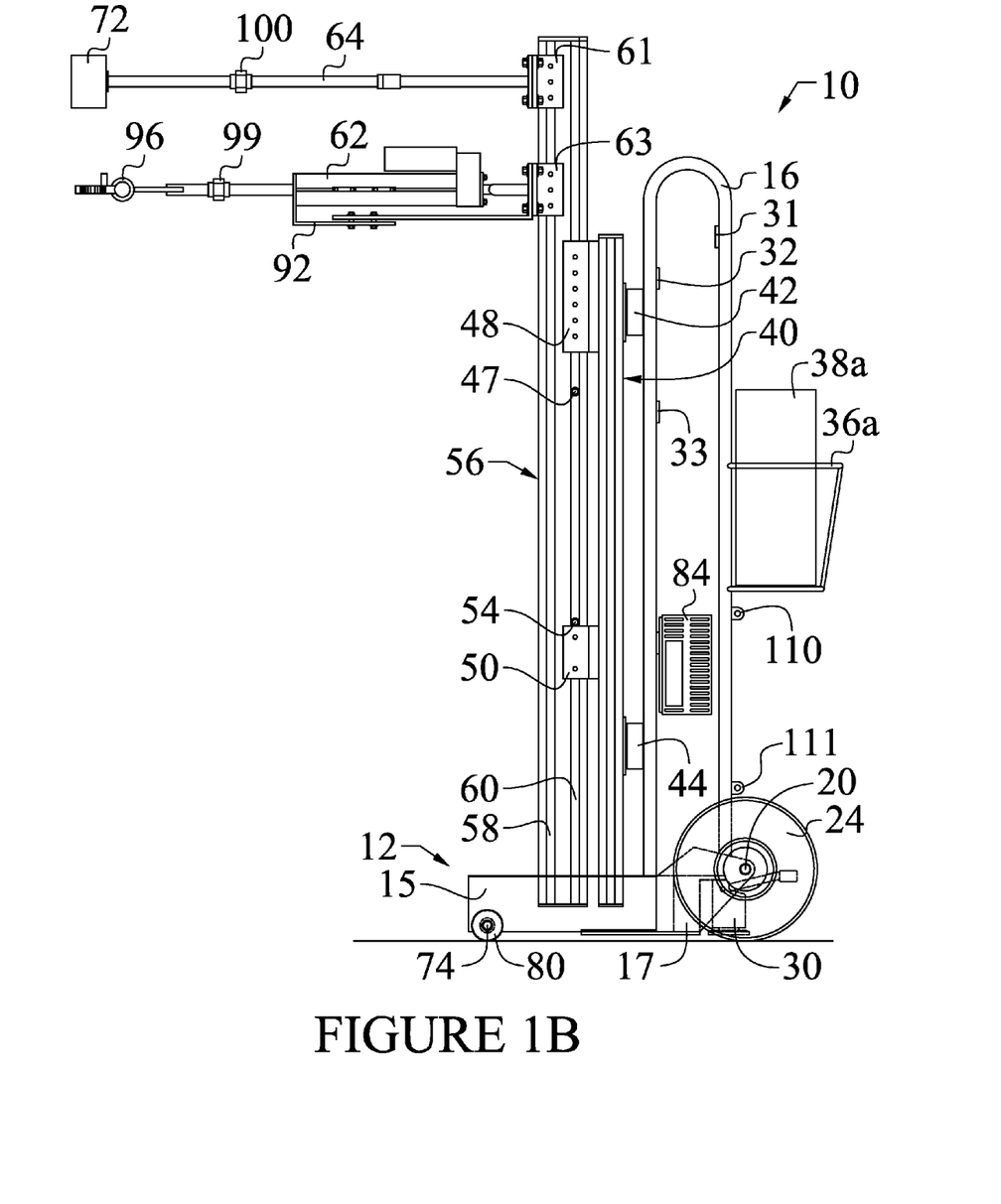
FIG. 1B is a right side view of the remote operable tool from a side opposite that shown in FIG. 1A.

The bucket extractor 10 can have a base support 12 with a first extension 13 and a second extension 15, which is shown in FIG. 1B, connected to a back side 17.

A first front wheel 78 and a second front wheel 80, which is shown in FIG. 1B, can be attached to a front axle 74. In another embodiment, the wheels can be attached directly to the first and second extensions.

In a similar fashion, a first load-supporting wheel 22 and a second load-supporting wheel 24, which is also shown in FIG. 1B, can be attached to a load-supporting axle 20.

The first load-supporting wheel 22 can be positioned proximate to a first riser 14, and the second load-supporting wheel 24 can be positioned proximate to a second riser 16, also shown in FIG. 1B.

In an embodiment the first riser 14 can attach to the first extension 13, and the second riser 16 can attach to the second extension 15, which is shown in FIGS. 1A and 1B.

Figure 2:
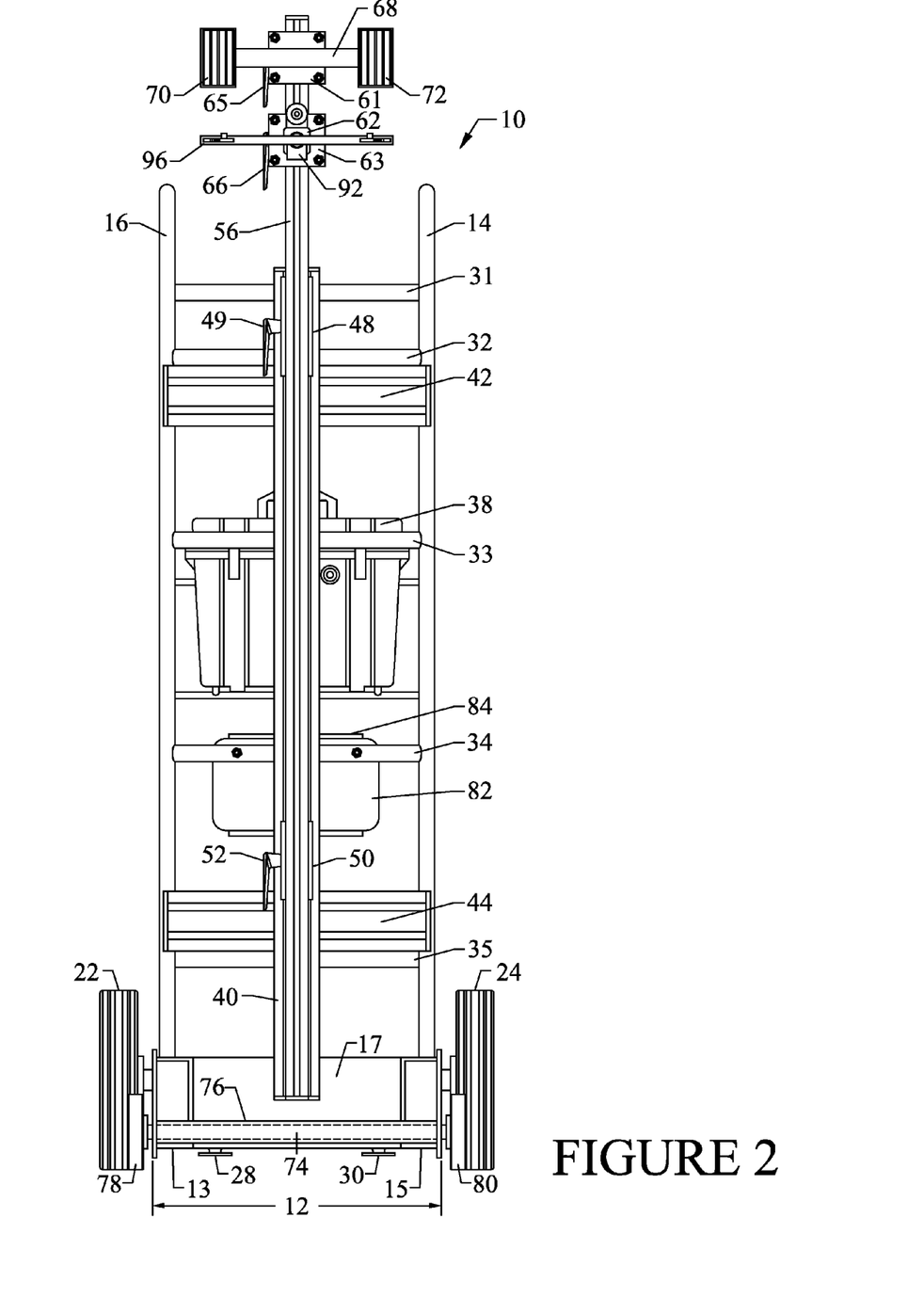
FIG. 2 is a front view of an embodiment of a bucket extractor.

Braces 31, 32, 33, 34 and 35, shown in FIG. 2, can be configured for use between the risers to ensure a sturdy, non-deforming bucket extractor.

A first floor lock 28 and a second floor lock 30 can be connected to the back side 17 of the base support 12. The first and second floor locks can be used to lock the base support 12 to a cement floor or similar stable surface. One foot lock can be used, but this embodiment is configured to use two. The foot locks can be configured to be pedal depressing types for engaging the floor with suction.

FIG. 1A shows a first high-lift support rail 40 which can be positioned between the first and second risers 14 and 16. The first high-lift support rail 40 can be mounted to a first high-lift support bracket 42 and a second high-lift support bracket 44 that can be connected to the first and second risers 14 and 16.

The first high-lift support rail 40 can be between 4 feet and 10 feet in length and can be made from very durable high strength aluminum. The rail can be generally hollow and light weight. In another embodiment the rail can be made from an aluminum alloy.

A moveable high-lift rail 56 can connect to the first high-lift support rail 40 using a first high-lift moveable slide 48 and a second high-lift moveable slide 50. The moveable high-lift rail 56 can have a first channel 58 and a second channel 60 which can be used for engaging the first and second high-lift moveable slides 48 and 50.

The first high-lift moveable slide 48 can have a first handle 49 and the second high-lift moveable slide 50 can have a second handle 52. First and second handles 49 and 52 can lock the first and second high-lift moveable slides 48 and 50 into a position along the second channel 60 of the moveable high-lift rail 56.

A first moveable slide 61, with a third handle 65, can connect a moveable mounting brace 64 to the moveable high-lift rail 56. The third handle 65 can lock the first movable slide 61 into a position along the first channel 58 of the movable high-lift rail 56.

A second moveable slide 63, with a fourth handle 66, can connect a linear actuator 62 to the moveable high-lift rail 56. The forth handle 66 can lock the second movable slide 63 into a position along the first channel 58 of the movable high-lift rail 56.

It can be contemplated that in an embodiment two or more linear actuators can be used simultaneously.

The moveable mounting brace 64 can have a cross brace 68, which is shown in FIG. 2, which can secure to a first and second moveable magnetic pad 70 and 72, which is shown in FIG. 1B. The first and second moveable magnetic pads 70 and 72 can be used to connect to a metal surface surrounding electrical equipment to be installed, removed or maintained while associated electrical equipment is operating at full electrical capacity. The moveable mounting brace 64 can be a solid brace, a telescoping brace, or combinations thereof.

A magnetic brace quick-disconnect 100 can be used to remove the first and second moveable magnetic pads 70 and 72 from the moveable mounting brace. A quick-disconnect can have a first extension that engages a second receptacle for a latching engagement that can be thumb released for fast break down.

A linear actuator 62 with a detachable push-pull unit 96 can be used to engage the electrical equipment to be installed, removed or maintained. The detachable push-pull unit 96 can be used to pull out an electric bucket while the adjacent electrical equipment is operating without fear of harm to an operator running the bucket extractor. The detachable push-pull unit 96 can be used to push in a bucket of metal with electrical equipment for maintenance or installation while adjacent electrical equipment that can arc is still running and operating.

The linear actuator 62 can be supported by a linear actuator bracket 92 for supporting the weight of the linear actuator and for connecting the linear actuator to first moveable slide 61.

The linear actuator can be made by CBS ARCSAFE of Denton, Tex. The linear actuator can be connected to the first moveable slide 61. A quick-disconnect 99 can be used with the linear actuator for quickly and easily removing or reinstalling push-pull units 96 of different sizes and configurations. The quick-disconnect 99 can be the same types as quick-disconnect 100, which can also be made by CBS ARC-SAFE of Denton, Tex.

The high-lift rail 56, with first and second channels 58 and 60, which can be attached to the first and second high-lift moveable slides 48 and 58, can enable the moving mechanism of the bucket extractor to be raised to a height greater than the height of the risers for operation of the linear actuator. The first channel and second channel are formed in the rail, so that the rail is a one piece structure for a more secure sliding engagement than other types of support devices.

A remote-switch operator 38a can be removably secured in a holding basket 36a. The holding basket 36a can be made of steel tubing, aluminum tubing, aluminum alloy tubing or combinations thereof. The holding basket can be welded to the first and second risers and can provide a container to safely support the remote-switch operator 38a.

In FIG. 1A, two remote-switch operators 38a and 38b are shown in holding baskets 36a and 36b.

It can be contemplated in an embodiment that one holding basket can be used to hold two remote-switch operators. It is contemplated that each remote-switch operator can provide power to and control signals to different individual linear actuators mounted to the moveable high-lift rail.

A first high-lift stop 47 and second high-lift stop 54 can be mounted in the second channel 60 of the moveable high-lift rail 56 for stopping motion up and down the rail. The first and second high-lift stops 47 and 54 can be rubber stops or metal stops.

It is contemplated that in another embodiment additional high-lift stops can be mounted in the first channel 58 of the moveable high-lift rail 56, to stop the movement of the first and second moveable slides 61 and 63 along the moveable high-lift rail 56.

A power supply mount 82 can be mounted on at least one brace that is mounted between the first and second risers 14 and 16. The power supply mount 82 can support an AC/DC power supply 84 that can plug into a wall socket with 100 volts of AC current. The power supply mount can be an insulated metal plate such as those that can be purchased from Fisher Scientific.

FIG. 1B shows a right side view of an embodiment of a bucket extractor 10.

The bucket extractor 10 can have a base support 12 with a first extension 13, which is shown in FIG. 1A, and a second extension 15 connected to a back side 17.

A first front wheel 78, shown in FIG. 1A, and a second front wheel 80 can be attached to a front axle 74. In another embodiment the wheels can be attached directly to the first and second extensions.

In a similar fashion, a first load-supporting wheel 22, which is shown in FIG. 1A, and a second load-supporting wheel 24 can be attached to a load-supporting axle 20.

The first load-supporting wheel 22 can be positioned proximate to a first riser 14, shown in FIG. 1A, and the second load-supporting wheel 24 can be positioned proximate to a second riser 16.

In an embodiment the first riser 14 can attach to the first extension 13, which is shown in FIG. 1A, and the second riser 16 can attach to the second extension 15.

Braces 31, 32, 33, 34 and 35, shown in FIG. 2, can be configured for use between the risers to ensure a sturdy, non-deforming bucket extractor.

A first floor lock 28, shown in FIG. 1A, and a second floor lock 30 can be connected to the back side 17 of the base support 12. The first and second floor locks can be used to lock the base support 12 to a cement floor or similar stable surface. One foot lock can be used, but this embodiment contemplates using two. The foot locks can be configured to be pedal depressing types for engaging the floor with suction.

FIG. 1B shows a first high-lift support rail 40 which can be positioned between the first and second risers 14 and 16. The first high-lift support rail 40 can be mounted to a first high-lift support bracket 42 and a second high-lift support bracket 44 that can be connected to the first and second risers 14 and 16.

The first high-lift support rail 40 can be between 4 feet and 10 feet in length and can be made from very durable high strength aluminum. The rail can be generally hollow and light weight. In another embodiment the rail can be made from an aluminum alloy.

A moveable high-lift rail 56 can connect to the first high-lift support rail 40 using a first high-lift moveable slide 48 and a second high-lift moveable slide 50. The moveable high-lift rail 56 can have a first channel 58 and a second channel 60 which can be used for engaging the first and second high-lift moveable slides 48 and 50.

A first moveable slide 61 can connect a moveable mounting brace 64 to the moveable high-lift rail 56.

A second moveable slide 63 can connect a linear actuator 62 to the moveable high-lift rail 56.

It can be contemplated that in an embodiment two or more linear actuators can be used simultaneously.

The moveable mounting brace 64 can have a cross brace 68, shown in FIG. 2, that can secure to a first and second moveable magnetic pad 70 and 72, which are shown in FIG. 1A. The first and second moveable magnetic pads 70 and 72 can be used to connect to a metal surface surrounding electrical equipment to be installed, removed or maintained while associated electrical equipment is operating at full electrical capacity. The moveable mounting brace 64 can be a solid brace, a telescoping brace, or combinations thereof.

A magnetic brace quick-disconnect 100 can be used to remove the first and second moveable magnetic pads 70 and 72 from the moveable mounting brace. A quick-disconnect can have a first extension that engages a second receptacle for a latching engagement that can be thumb released for fast break down.

A linear actuator 62 with a detachable push-pull unit 96 can be used to engage the electrical equipment to be installed, removed or maintained. The detachable push-pull unit 96 can be used to pull out an electric bucket while the adjacent electrical equipment is operating without fear of harm to an operator running the bucket extractor. The detachable push-pull unit 96 can be used to push in a bucket of metal with electrical equipment for maintenance or installation while adjacent electrical equipment that can arc is still running and operating.

The linear actuator 62 can be supported by a linear actuator bracket 92 for supporting the weight of the linear actuator and for connecting the linear actuator to first moveable slide 61.

The linear actuator can be made by CBS ARCSAFE of Denton, Tex. The linear actuator can be connected to the first moveable slide 61. A quick-disconnect 99 can be used with the linear actuator for quickly and easily removing or reinstalling push-pull units 96 of different sizes and configurations. The quick-disconnect 99 can be the same types as quick-disconnect 100 which can be made by CBS ARCSAFE of Denton, Tex.

The high-lift rail 56, with first and second channels 58 and 60, which can be attached to the first and second high-lift moveable slides 48 and 58, can enable the moving mechanism of the bucket extractor to be raised to a height greater than the height of the risers for operation of the linear actuator. The first channel and second channel are formed in the rail, so that the rail is a one piece structure for a more secure sliding engagement than other types of support devices.

A remote-switch operator 38a can be removably secured in a holding basket 36a. The holding basket 36a can be made of steel tubing, aluminum tubing, aluminum alloy tubing or combinations thereof. The holding basket can be welded to the first and second risers and can provide a container to safely support the remote-switch operator 38a.

In FIG. 1B, one remote-switch operators 38a is shown in holding baskets 36a.

It can be contemplated in an embodiment that one holding basket can be used to hold two remote-switch operators. It is contemplated that each remote-switch operator can provide power to and control signals to different individual linear actuators mounted to the moveable high-lift rail.

A first high-lift stop 47 and second high-lift stop 54 can be mounted in the second channel 60 of the moveable high-lift rail 56 for stopping motion up and down the rail. The first and second high-lift stops 47 and 54 can be rubber stops or metal stops.

It is contemplated that in another embodiment additional high-lift stops can be mounted in the first channel 58 of the moveable high-lift rail 56 to stop the movement of the first and second moveable slides 61 and 63 along the moveable high-lift rail 56.

A power supply mount 82 can be mounted on at least one brace that is mounted between the first and second risers 14 and 16. The power supply mount 82 can support an AC/DC power supply 84 that can plug into a wall socket with 100 volts of AC current. The power supply mount can be an insulated metal plate such as those that can be purchased from Fisher Scientific.

It can be contemplated in an embodiment that stair climber holders 110 and 111 can be formed in the risers. Brackets (not shown) can be commercially purchased and secured to these stair climber holders enabling the risers to smoothly move over stairs with only one person moving the bucket extractor.

FIG. 2 provides a front view of the bucket extractor 10 with the base support 12.

Front axle 74, which can be supported by a front axle tube 76, and first and second front wheel 78 and 80 can be seen in FIG. 2, along with first and second load-supporting wheels 22 and 24.

It is contemplated that each of the wheels can be made of a durable polymer like a polyamide or nylon, or possibly an elastomeric. The front wheels can have a diameter less than 25 percent of the diameter of the load-supporting wheels. For example, the front wheels can have a diameter of 4 inches and the load-supporting wheel can be 12 inches.

The first and second extensions 13 and 15 of the base support 12 which can be connected via the back side 17 can be seen in FIG. 2. The back side and first and second extensions can be made of steel, aluminum, an aluminum alloy, or combinations thereof.

The first load-supporting wheel 22 is shown along with the second load-supporting wheel 24.

The two moveable high-lift support brackets 42 and 44 can be viewed between the first and second risers 14 and 16.

Braces 31, 32, 33, 34 and 35 are shown engaging the first and second risers 14 and 16.

The moveable high-lift rail 56 can be viewed engaging the first movable high-lift slider 48 with handle 49 and the second moveable high-lift slider 50 with handle 52.

In this embodiment one remote-switch operator 38a is shown. The power supply mount 82 which can hold the power supply 84 is shown attached to brace 34.

Also viewable in this FIG. 2 is the push-pull unit 96 engaged with the linear actuator 62. The linear actuator 62 is shown supported by linear actuator bracket 92 which can attach to the second moveable slide 63 with fourth handle 66.

The first and second moveable magnetic pads 70 and 72, of the moveable mounting brace, are shown secured to the crossbeam 68. The moveable mounting brace can be attached to the first moveable slide 61 with third handle 65.

Figure 3:
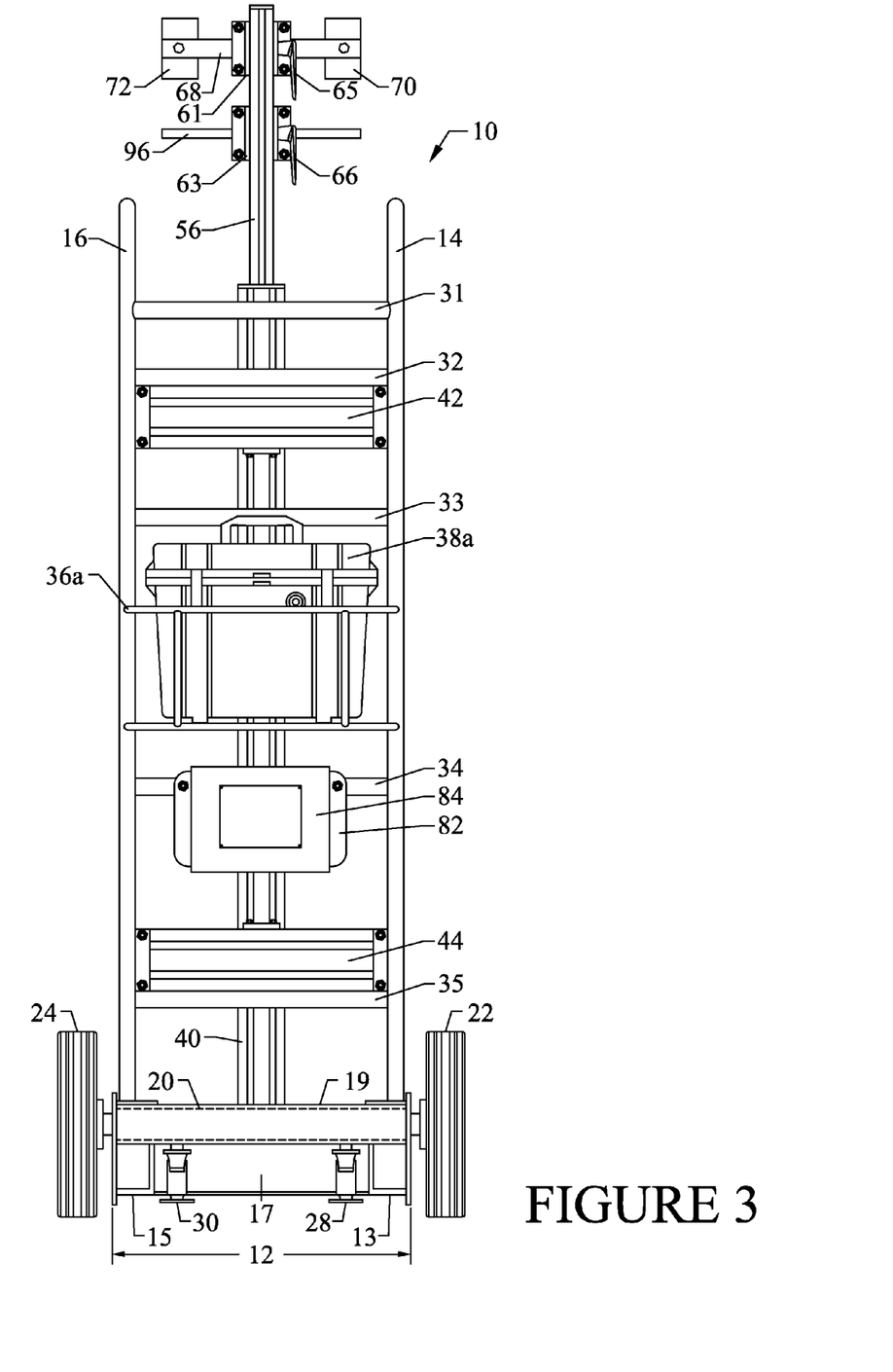
FIG. 3 is a back view of an embodiment of a bucket extractor.

FIG. 3 depicts a back view of the bucket extractor 10.

The first high-lift support rail 40 and the moveable high-lift rail 56 can be seen located between the first and second risers, 14 and 16.

The high-lift support brackets 42 and 44 are can be seen fastened between the first and second risers 14 and 16. In this embodiment the brackets 42 and 44 are bolted to the risers, but the brackets, which can be made of aluminum, can be welded to the bracket as well.

Braces 31, 32, 33, 34 and also be seen positioned between the first and second risers 14 and 16.

The first and second load-supporting wheels 22 and 24 can be viewed in this embodiment. The load-supporting wheels can be about 4 inches to about 12 inches in diameter and can have rubberized wheels over steel inserts, or be made of a 100% rubberized material.

In contrast, in an embodiment the front wheels can be polyamide wheels with a diameter of about 2 inches to about 4 inches, and mainly used for turning the tool easily while moving and providing a 4 point support frame, unlike others in the industry which provides both high stability and ease of movability simultaneously.

The load-supporting wheels can be attached to the load-supporting axle 20. The load-supporting axle 20 can be supported by a load-supporting axle tube 19.

Also shown in this view are first and second floor locks 28 and 30 which can be attached to the back side 17 of the base support 12. First floor lock 28, can be positioned adjacent first extension 13 and second floor lock 30 can be positioned adjacent the second extension 15. The floor locks can be pedal operated floor locks wherein a plate of the floor lock engages the ground, providing a secure platform for the bucket extractor 10.

The power supply mount 82 is shown connected to brace 34, which can in turn support the AC/DC power supply 84.

A holding basket 36a can also be seen holding a remote-switch operator 38a.

Moveable high-lift rail 56 can be seen with the first movable slide 61 attached. The First movable slide 61 can have third handle 61. First and second moveable magnetic pads are shown attached to the crossbeam 68.

The second moveable slide 63 with fourth handle 66 can be seen along with a portion of the push-pull unit 96.

Figure 4:
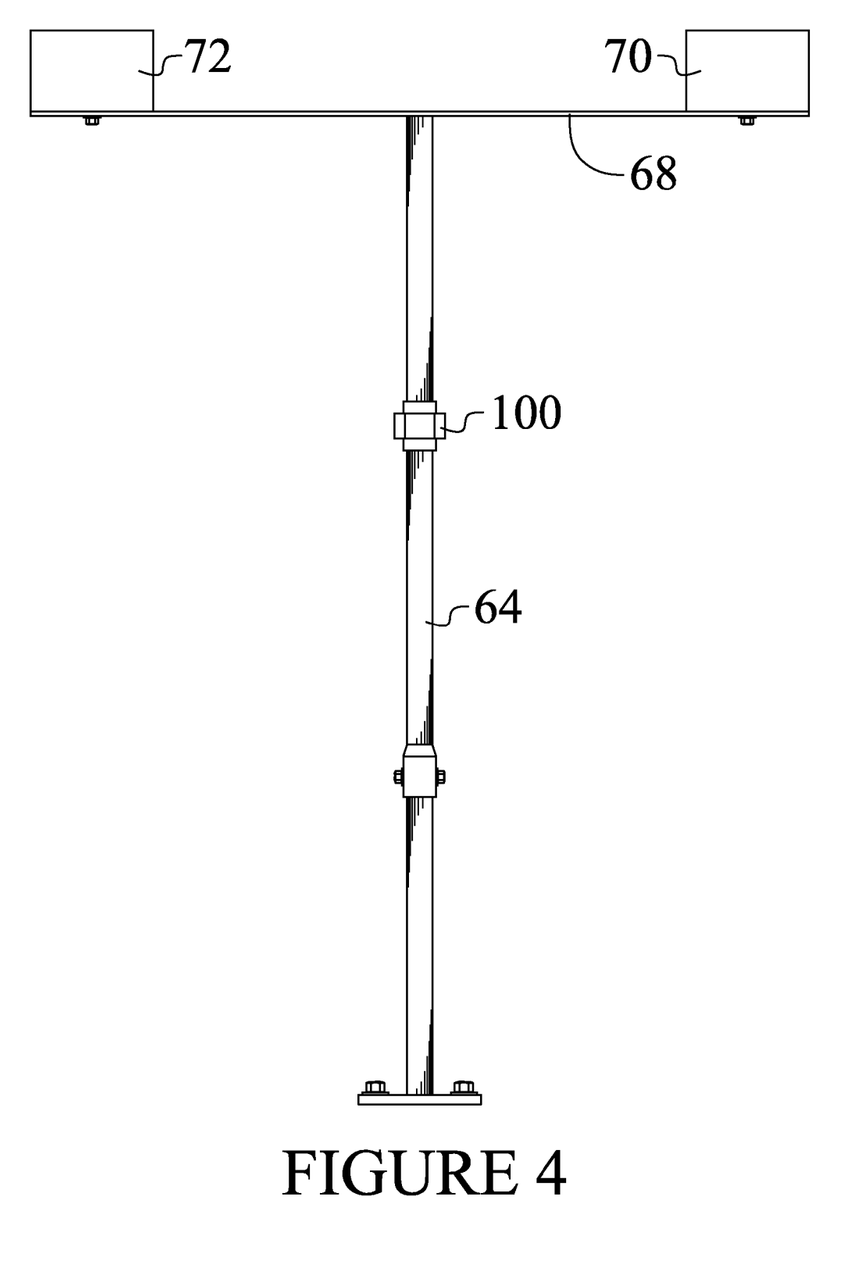
FIG. 4 is a detail of the magnetic supports used to hold the bucket extractor to the equipment of interest.

FIG. 4 shows a top view of the moveable mounting brace 64 having a crossbeam 68 supporting a first moveable magnetic pad 70 and a second moveable magnetic pad 72.

The magnetic pads can be contained within housings. The magnetic pads can be extendable or retractable in their housing. The magnetic pads can each have a face that is usable for engaging metal around electrical equipment to be maintained or repaired or switched out with the push-pull device 96.

Figure 5:
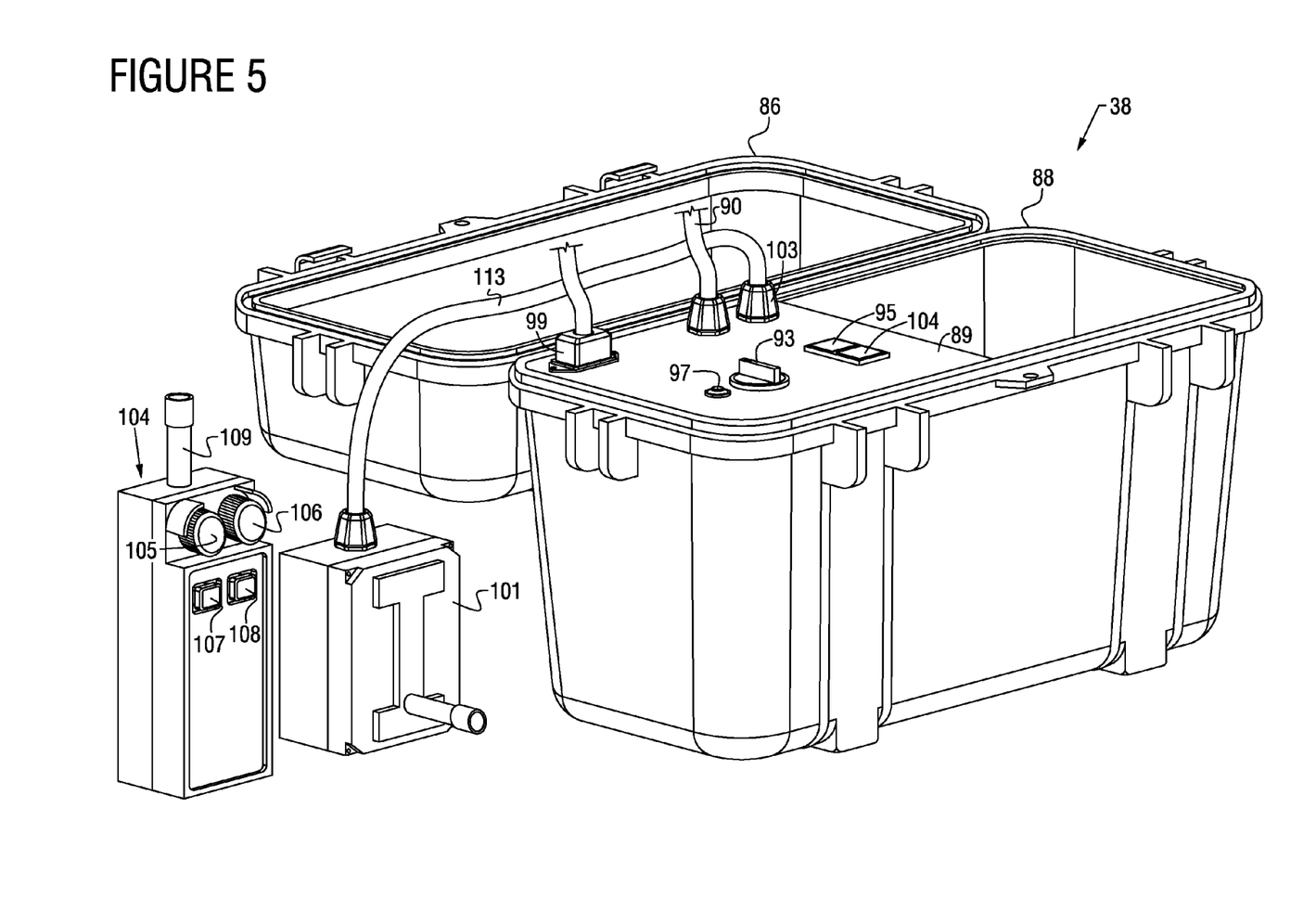
FIG. 5 is an open lid version of a remote-switch operator usable with the bucket extractor.

FIG. 5 shows an embodiment of a remote-switch operator usable with the bucket extractor.

A remote-switch operator 38a can have a body 88 and a lid 86 which can be hinged to the body. In this view, the lid is in an open position.

The body can have a face plate 89. The face plate 89 can have an on/off switch 93, an install momentary push button 95, a remove momentary push button 104, and a circuit breaker 97.

An actuator cord 90 can provide power and signals to the linear actuator 62, shown in FIG. 1A.

A wireless remote transmitter/receiver 101 can be connected by a cable 113 to a plug 103 in the face plate.

A wireless remote controller 104 can be in communication with the wireless remote transmitter/receiver 101.

The wireless remote controller 104 can have a remote-on button 105, a remote-off button 106, a remote-install button 107, a remote-remove button 108, and an antenna 109.

An AC/DC power plug 99 can also be located in the face plate 89. The AC power plug 99 can receive power from the AC/DC power supply 84 or another AC/DC power source 114.

Figure 6:
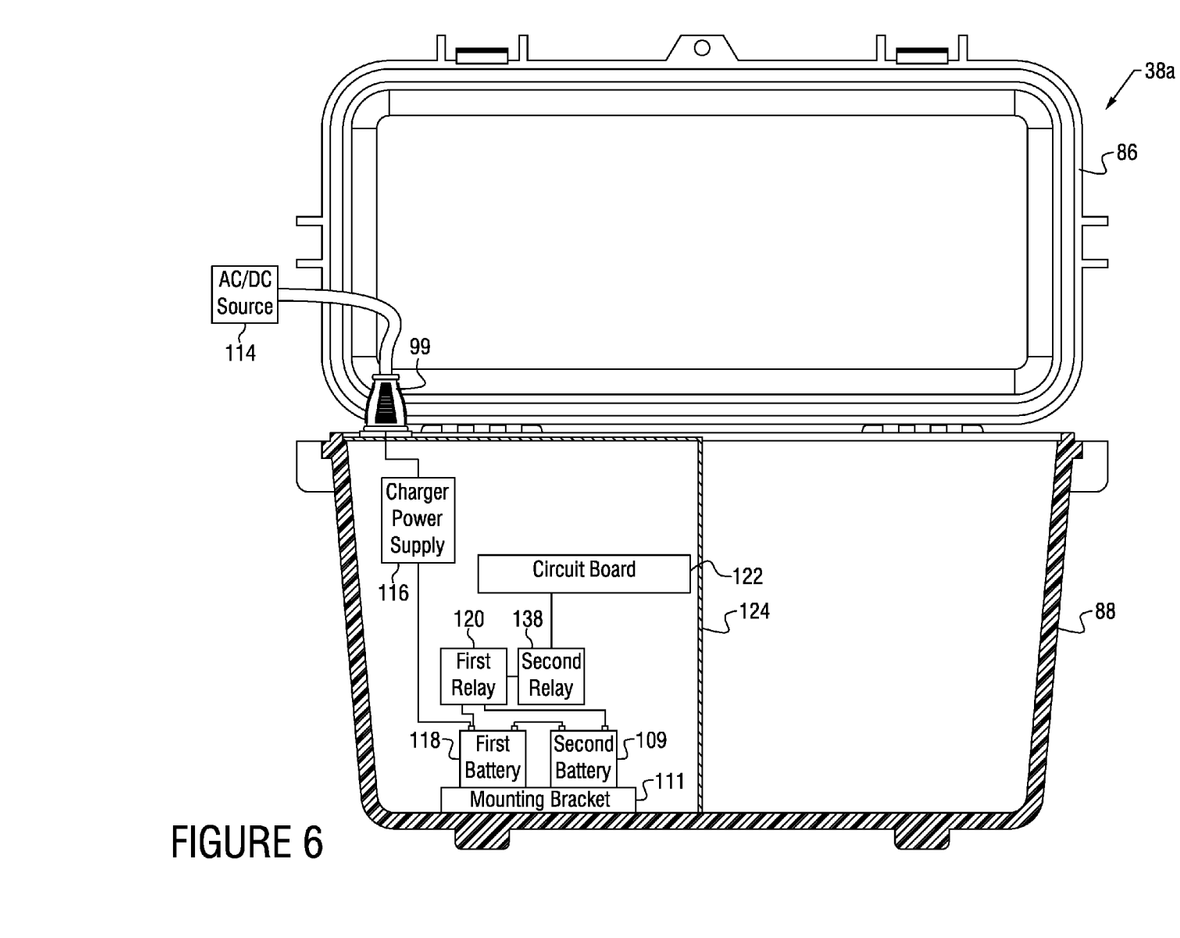
FIG. 6 is a diagram of the components under the face plate of the remote-switch operator of FIG. 5.

FIG. 6 is a diagram of the components under the face plate of the remote-switch operator of FIG. 5.

The install momentary push button 95 mounted to the face plate can be connected to a relay 120 and circuit board 122 disposed beneath the face plate 89. A remove momentary push button 104 can be mounted to the face plate and connected to the relay 120 and circuit board 122.

A circuit breaker 97 can be connected between a battery 118 and the relay 120.

An AC/DC power plug 99 can be located in the face plate 89 and can receive power from an AC/DC source 114 that is outside the housing.

A charger power supply 116 can engage the AC/DC power plug in the body beneath the face plate and the battery.

Additionally, FIG. 6 shows that a second side 124 of the face plate can connect to the face plate for ensuring a watertight connection around the battery and circuit board. The first battery and a second battery 109 can be secured to the body with a mounting bracket 111.

Figure 7:
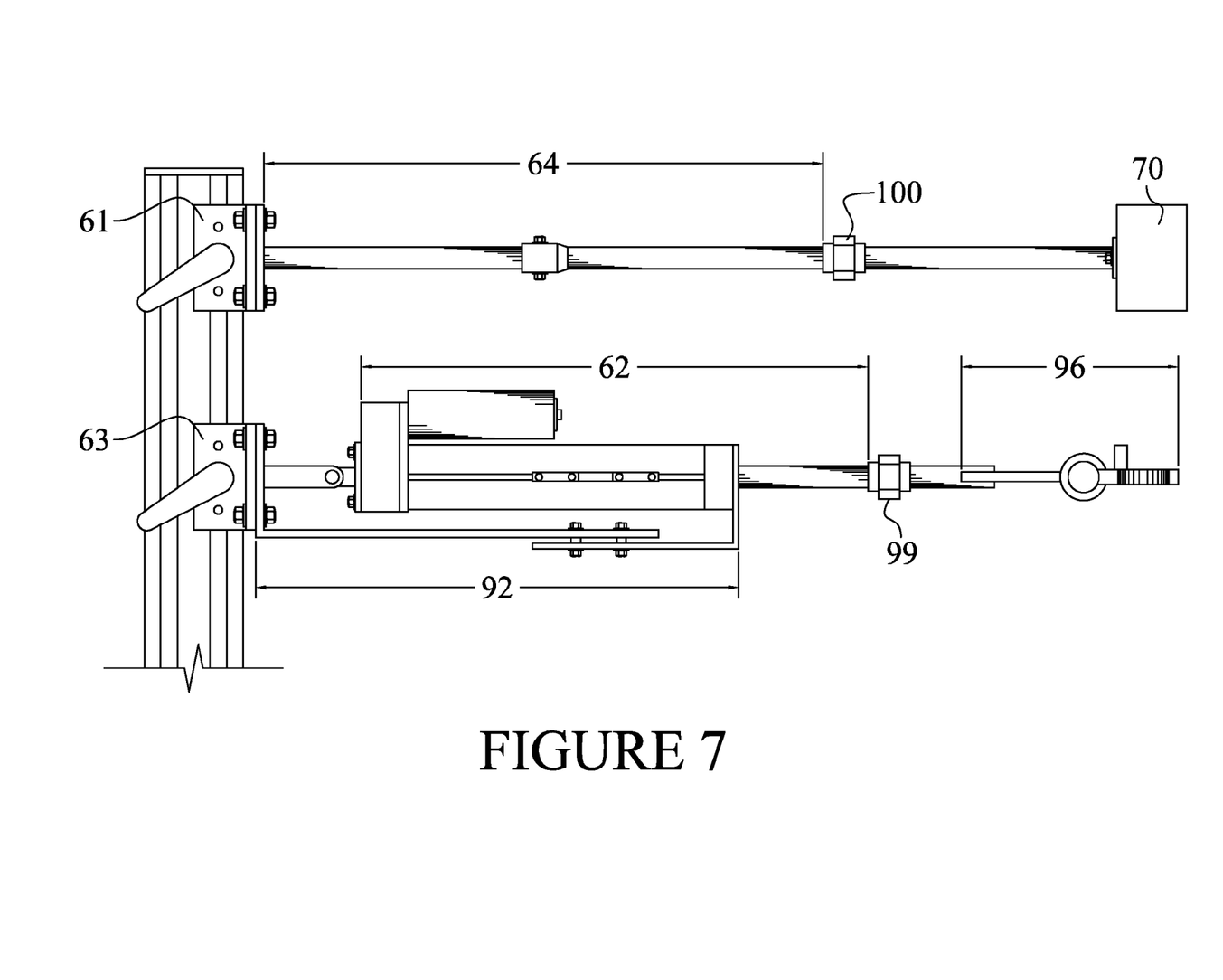
FIG. 7 is a detail of a linear actuator usable in the invention.

FIG. 7 shows the linear actuator 62 in more detail as well as the magnetic mounting brace 64.

The linear actuator 62 can be mounted to a linear actuator support bracket 92. The linear actuator can connect with a linear actuator quick-disconnect 99 that in turn can engage a "push-pull" mechanism 96.

The push-pull mechanism can be one of a variety of shapes and sizes, but must function to pull out a bucket such as a bucket of circuit breakers or push in the bucket, such as a bucket of circuit breakers in one stroke.

The push-pull mechanism 96 shown in this embodiment is triangular in shape with a ridge and a first hook on one end and a second hook on the other end and can be quickly engaged and disconnected form the linear actuator at the quick-disconnect 99.

The magnetic brace 64 is shown with a magnetic brace quick-disconnect 100. The Figure shows the first moveable magnetic pad 70 that can be extendable to connect with metal around the electric equipment, which can be a bucket for circuit breakers.

While these embodiments have been described with emphasis on the embodiments, it should be understood that within the scope of the appended claims, the embodiments might be practiced other than as specifically described herein.

What is claimed is:

1. A remote-control electric equipment replacement tool comprising:
   a. a first riser and a second riser extending from a base support, wherein the base support provides a first load-supporting wheel and a second load-supporting wheel;
   b. at least one floor lock to prevent movement of the base support;
   c. a high-lift support rail fixed to a first and second high-lift rail bracket connected between the first and second risers;
   d. a first high-lift support rail bracket and a second high-lift support rail bracket connected between the first and second risers for supporting the high-lift support rail;
   e. a first high-lift moveable slide connected to the first high-lift support rail and a second high-lift moveable slide connected to the first high-lift support rail;
   f. a moveable high-lift rail connected to the first and second high-lift moveable slides;
   g. a first moveable slide connected to the moveable high-lift rail;
   h. a second moveable slide connected to the moveable high-lift rail;
   i. a moveable mounting brace with at least one moveable magnetic pad for engaging a metal surface proximate to electrical equipment of interest, wherein the moveable mounting brace is telescopically connected to the second moveable slide;
   j. a linear actuator with a detachable push-pull unit for engaging electrical equipment of interest and removing or inserting a portion of the electrical equipment while adjacent electrical equipment is operating with a voltage connected to the first moveable slide; and
   k. a remote-switch operator connected to the linear actuator for remotely controlling and powering the linear actuator.

2. The remote-control electric equipment replacement tool of claim 1, wherein the base support has a first extension and a second extension connected by a back side.

3. The remote-control electric equipment replacement tool of claim 1, further comprising a holding basket connected between the risers for supporting the remote-switch operator.

4. The remote-control electric equipment replacement tool of claim 1, wherein the high-lift support rail is between 4 feet and 10 feet in length.

5. The remote-control electric equipment replacement tool of claim 1, wherein the high-lift support rail is made from a hollow, lightweight, strong aluminum alloy.

6. The remote-control electric equipment replacement tool of claim 1, further comprising a plurality of moveable slides, wherein each moveable slide supports a linear actuator connected to the remote-switch operator.

7. The remote-control electric equipment replacement tool of claim 6, further comprising a plurality of remote-switch operators, wherein each remote-switch operator provides power to and controls a linear actuator.

8. The remote-control electric equipment replacement tool of claim 1, wherein the moveable high-lift rail comprises a first channel and a second channel.

9. The remote-control electric equipment replacement tool of claim 1, further wherein the moveable mounting brace comprises a cross brace supporting the first moveable magnetic pad opposite a second moveable magnet pad disposed for removably engaging the metal around the electrical equipment to be installed, removed or maintained.

10. The remote-control electric equipment replacement tool of claim 9, wherein the moveable mounting brace is connected to the cross brace with a magnetic brace quick-disconnect for attaching and reattaching different cross braces to the movable mounting brace.

11. The remote-control electric equipment replacement tool of claim 1, further comprising a front axle connected to the base support, wherein the front axle has a first front wheel and a second front wheel.

12. The remote-control electric equipment replacement tool of claim 10, wherein the first and second front wheels have a diameter less than 25 percent the diameter of the load-supporting wheels.

13. The remote-control electric equipment replacement tool of claim 1, further comprising a power supply mount mounted between the first and second risers on at least one brace mounted between the risers for supporting an AC/DC power supply engageable with 110 volts of AC current.

14. The remote-control electric equipment replacement tool of claim 1, further comprising a linear actuator support bracket for supporting the linear actuator on the moveable high-lift rail, and further comprising a quick-disconnect for use with the linear actuator to quickly install and replace push-pull units as needed.

15. The remote-control electric equipment replacement tool of claim 1, further comprising at least two high-lift stops mounted to the moveable high-lift rail to prevent excessive movement of the moveable high-lift rail.

16. The remote-control electric equipment replacement tool of claim 1, further comprising a plurality of braces disposed between the first and second risers.

17. The remote-control electric equipment replacement tool of claim 1, wherein the remote-switch operator comprises:
   a. a body with a lid;
   b. a face plate in the body;
   c. an actuator cord for engaging the linear actuator;
   d. an on/off switch in the face plate;
   e. an install momentary push button mounted to the face plate and connected to a relay and circuit board disposed beneath the face plate;
   f. a remove momentary push button mounted to the face plate and connected to the relay and circuit board;
   g. a circuit breaker connected between a battery and the relay;
   h. an AC power plug in the face plate for receiving power from an AC source;
   i. a wireless remote transmitter/receiver connected to a plug in the face plate by a cable;
   j. a wireless remote controller for communicating with the wireless remote transmitter/receiver;
   k. a charger power supply connected to the AC power plug in the body beneath the face plate and the battery; and
   l. a second side connected to the face plate for ensuring a watertight connection around the battery and circuit board.

18. The remote-control electric equipment replacement tool of claim 17, wherein the wireless remote controller comprises a remote-on button, a remote-off button, a remote-install button, a remote-remove button, and an antenna.

* * * * *